US012435020B2

(12) United States Patent
Hasumoto et al.

(10) Patent No.: US 12,435,020 B2
(45) Date of Patent: Oct. 7, 2025

(54) MANUFACTURING METHOD FOR HYDROFLUOROOLEFIN OR FLUOROOLEFIN

(71) Applicants: DAIKIN INDUSTRIES, LTD., Osaka (JP); OSAKA UNIVERSITY, Osaka (JP)

(72) Inventors: Yuuta Hasumoto, Osaka (JP); Tatsuya Takakuwa, Osaka (JP); Osamu Yamamoto, Osaka (JP); Hideki Nakaya, Osaka (JP); Masao Noumi, Osaka (JP); Kazuyuki Satou, Osaka (JP); Kohei Yamanoi, Osaka (JP); Akihiro Oshima, Osaka (JP)

(73) Assignees: DAIKIN INDUSTRIES, LTD., Osaka (JP); OSAKA UNIVERSITY, Osaka (JP)

( * ) Notice: Subject to any disclaimer, the term of this patent is extended or adjusted under 35 U.S.C. 154(b) by 575 days.

(21) Appl. No.: 17/895,529

(22) Filed: Aug. 25, 2022

(65) Prior Publication Data
US 2023/0014347 A1 Jan. 19, 2023

Related U.S. Application Data

(63) Continuation of application No. PCT/JP2021/006729, filed on Feb. 24, 2021.

(30) Foreign Application Priority Data

Feb. 28, 2020 (JP) ................................. 2020-033376

(51) Int. Cl.
*C07C 17/278* (2006.01)
*C07C 17/269* (2006.01)

(52) U.S. Cl.
CPC .......... *C07C 17/278* (2013.01); *C07C 17/269* (2013.01)

(58) Field of Classification Search
CPC ...... C07C 17/269; C07C 17/278; C07C 21/18
See application file for complete search history.

(56) References Cited

U.S. PATENT DOCUMENTS

| | | |
|---|---|---|
| 2016/0347693 A1 | 12/2016 | Fukushima et al. |
| 2018/0037524 A1 | 2/2018 | Tomiyori et al. |
| 2021/0147323 A1 | 5/2021 | Usui et al. |
| 2021/0246090 A1 | 8/2021 | Usui et al. |
| 2021/0269693 A1 | 9/2021 | Itano et al. |

FOREIGN PATENT DOCUMENTS

| | | |
|---|---|---|
| CN | 105753634 | 7/2016 |
| JP | 2013-241348 | 12/2013 |
| WO | 02/06193 | 1/2002 |
| WO | 2015/125877 | 8/2015 |
| WO | 2016/163522 | 10/2016 |
| WO | 2019/240233 | 12/2019 |
| WO | 2020/017386 | 1/2020 |

OTHER PUBLICATIONS

Machine translation of JP2013241348A, Dec. 5, 2013 (Year: 2013).*
Extended European Search Report issued Feb. 28, 2024 in corresponding European Patent Application No. 21761593.9.
International Search Report issued Apr. 20, 2021 in corresponding International (PCT) Patent Application No. PCT/JP2021/006729.
International Preliminary Report on Patentability issued Aug. 30, 2022 in corresponding International (PCT) Patent Application No. PCT/JP2021/006729.

* cited by examiner

Primary Examiner — Medhanit W Bahta
(74) Attorney, Agent, or Firm — Wenderoth, Lind & Ponack, L.L.P.

(57) ABSTRACT

This disclosure provides a method for producing a hydrofluoroolefin (HFO) or fluoroolefin (FO), which is a target compound, with high selectivity, without requiring a high temperature and a catalyst in a synthesis process of the target compound. Specifically, the present disclosure provides a method for producing a hydrofluoroolefin or fluoroolefin having two, three, or four carbon atoms, comprising irradiating at least one starting material compound selected from the group consisting of hydrofluorocarbons having one or two carbon atoms and hydrofluoroolefin As having two or three carbon atoms with ionizing radiation and/or an ultraviolet ray having a wavelength of 300 nm or less, with the proviso that when the at least one starting material compound is the hydrofluoroolefin A, the resulting hydrofluoroolefin is different from the hydrofluoroolefin A.

7 Claims, No Drawings

MANUFACTURING METHOD FOR HYDROFLUOROOLEFIN OR FLUOROOLEFIN

TECHNICAL FIELD

The present disclosure relates to a method for producing a hydrofluoroolefin or fluoroolefin.

BACKGROUND ART

Hydrofluoroolefins (HFOs) are useful compounds as various functional materials, solvents, refrigerants, foaming agents, monomers for functional polymers, or starting materials of such monomers, and they offer promising prospects as refrigerants with low global warming potential (GWP). Fluoroolefins (FOs) are also useful compounds as monomers for functional polymers.

As prior art relating to the present disclosure, Patent Literature 1 discloses a method for producing 1,2-difluoroethylene by a synthetic reaction involving thermal decomposition from a (hydrofluorocarbon: HFC) compound represented by formula (1):

$$CH_2FX \qquad (1)$$

wherein X is a halogen atom.

In addition to the above thermal decomposition method of HFC, a method using a catalytic reaction is also known.

CITATION LIST

Patent Literature

PTL 1: JP2013-241348A

SUMMARY

A method for producing a hydrofluoroolefin or fluoroolefin having two, three, or four carbon atoms, comprising irradiating at least one starting material compound selected from the group consisting of hydrofluorocarbons having one or two carbon atoms and hydrofluoroolefin As having two or three carbon atoms with ionizing radiation and/or an ultraviolet ray having a wavelength of 300 nm or less, with the proviso that when the at least one starting material compound is the hydrofluoroolefin A, the resulting hydrofluoroolefin is different from the hydrofluoroolefin A.

Advantageous Effects

The method for producing an HFO or FO according to the present disclosure can provide a method for producing an HFO or FO, which is a target compound, with high selectivity.

DESCRIPTION OF EMBODIMENTS

The present disclosers conducted extensive research to solve the above problems, and found that the problems can be solved by a production method comprising irradiating a specific starting material compound with ionizing radiation and/or an ultraviolet ray having a wavelength of 300 nm or less.

The present disclosure was accomplished as a result of further research based on the above finding. The present disclosure includes the following embodiments.

Method for Producing a Hydrofluoroolefin (HFO) or Fluoroolefin (FO)

In the method for producing a hydrofluoroolefin (HFO) or fluoroolefin (FO) of the present disclosure, a hydrofluoroolefin or fluoroolefin having two, three, or four carbon atoms can be obtained by irradiating at least one starting material compound selected from the group consisting of hydrofluorocarbons having one or two carbon atoms and hydrofluoroolefin As having two or three carbon atoms with ionizing radiation and/or an ultraviolet ray having a wavelength of 300 nm or less (with the proviso that when the starting material compound is the hydrofluoroolefin A, the resulting hydrofluoroolefin is different from the hydrofluoroolefin A.)

In the present specification, hydrofluorocarbon, hydrofluoroolefin, hydrofluoroolefin A, and fluoroolefin are respectively referred to below as a "HFC," "HFO," "HFOA," and "perfluoroolefin, FO."

At least one starting material compound selected from the group consisting of hydrofluorocarbons having one or two carbon atoms and hydrofluoroolefin As having two or three carbon atoms is not limited as long as an HFO or FO having two, three, or four carbon atoms (with the proviso that when the starting material compound is an HFOA, the HFO is different from the HFOA) can be obtained by irradiating at least one starting material compound with ionizing radiation and/or an ultraviolet ray having a wavelength of 300 nm or less (collectively referred to below as "ionizing radiation or the like").

The HFC having one carbon atom is not limited. Examples include a fluoromethane compound represented by formula (1):

with the proviso that $X_1$, $X_2$, $X_3$, and $X_4$ are each individually a hydrogen atom or fluorine atom, and at least one hydrogen atom and at least one fluorine atom are contained.

Specific examples include fluoromethane (HFC-41), difluoromethane (HFC-32), and trifluoromethane (HFC-23). In the present disclosure, in addition to the fluoromethane compound represented by formula (1), tetrafluoromethane (FC-14) in which $X_1$, $X_2$, $X_3$, and $X_4$ are all fluorine atoms can be used in the present disclosure. The use of FC-14 is expected to improve the selectivity of HFO or FO having a high fluorine content.

The HFC having two carbon atoms is not limited. Examples include a fluoroethane compound represented by formula (2):

with the proviso that $Y_1$, $Y_2$, $Y_3$, $Y_4$, $Y_5$, and $Y_6$ are each individually a hydrogen atom or fluorine atom, and at least one hydrogen atom and at least one fluorine atom are contained. Specific examples include 1,1,2,2-tetrafluoroethane (HFC-134), 1,1,2-trifluoroethane (HFC-143), 1,1,1,2-tetrafluoroethane (HFC-134a), 1,1,1-trifluoroethane (HFC-143a), pentafluoroethane (HFC-125), 1,1-difluoroethane (HFC-152a), 1,2-difluoroethane (HFC-152), monofluoroethane (HFC-161), tetrafluoroethane (HFC-116), and the like. In the present disclosure, in addition to the fluoroethane compound represented by formula (2), hexafluoroethane (FC-116) in which $Y_1, Y_2, Y_3, Y_4, Y_5$ and $Y_6$ are all fluorine atoms can be used.

The HFOA having two carbon atoms is not limited, and examples include at least one fluoroethylene compound represented by formula (3):

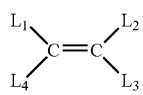

(3)

with the proviso that $L_1, L_2, L_3,$ and $L_4$ are each individually a hydrogen atom or fluorine atom, and at least one hydrogen atom and at least one fluorine atom are contained. Specific examples include cis-1,2-difluoroethylene (HFO-1132 (Z)), trans-1,2-difluoroethylene (HFO-1132 (E)), trifluoroethylene (HFO-1123), and the like. In the present disclosure, in addition to the fluoroethylene compound represented by formula (3), tetrafluoroethylene (TFE, FO-1114) in which $L_1, L_2, L_3,$ and $L_4$ are all fluorine atoms can be used.

The HFOA having three carbon atoms is not particularly limited, and examples include at least one fluoropropene compound represented by formula (4):

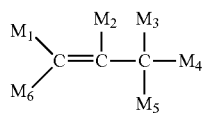

(4)

with the proviso that $M_1, M_2, M_3, M_4, M_5,$ and $M_6$ are each individually a hydrogen atom or fluorine atom, and at least one hydrogen atom and at least one fluorine atom are contained. Specific examples include 2,3,3,3-tetrafluoropropene (HFO-1234yf) and the like. In addition to the fluoropropene compound represented by formula (4), hexafluoropropene in which $M_1, M_2, M_3, M_4, M_5,$ and $M_6$ are all fluorine atoms can be used.

In the present disclosure, of these starting material compounds, at least one member selected from the group consisting of fluoromethane (HFC-41), difluoromethane (HFC-32), trifluoromethane (HFC-23), 1,1,2,2-tetrafluoroethane (HFC-134), 2,3,3,3-tetrafluoropropene (HFO-1234yf), and 1,1,2-trifluoroethane (HFC-143) is preferred because the HFO or FO, which is a target compound, can be obtained with high selectivity.

In the present disclosure, the HFO or FO, which is a target compound, can be obtained by irradiating these starting material compounds with ionizing radiation and/or an ultraviolet ray having a wavelength of 300 nm or less. The ionizing radiation is not limited as long as irradiation to the starting material compound can selectively break the bond in the starting material compound to produce a radical in which fluorine is eliminated by elimination of at least a fluorine atom, thus finally enabling the obtainment of a target compound HFO or FO. Examples of the ionizing radiation include an electron beam (β-ray), X-ray, γ-ray, neutron beam, ion beam, and the like. Similarly, plasma with ionization can also be used.

Among the ionizing radiation, a γ-ray is particularly preferred because it can transmit a metal container, and thus, γ-ray irradiation can be performed on a simple metal container (e.g., stainless steel (SUS) tube) filled with a starting material compound. In the present disclosure, energy rays can be used alone or in a combination of two or more as ionizing radiation. Ultraviolet rays having a wavelength of 300 nm or less, as described below, can also be used alone or in a combination of two or more ultraviolet rays having a wavelength within the above range. Specifically, the ionizing radiation or the like can be not only monochromatic. Energy rays having different wavelengths or types can be used in combination, and the ionizing radiation or the like can be white.

As with ionizing radiation, irradiation of the starting material compound with an ultraviolet ray having a wavelength of 300 nm or less can selectively break the bond in the starting material compound to produce a radical in which fluorine is eliminated by elimination of at least a fluorine atom. Since such an effect cannot be attained by an ordinary ultraviolet ray, an ultraviolet ray particularly having a wavelength of 300 nm or less among ultraviolet rays can be used in the present disclosure.

In the present disclosure, when the starting material compound is irradiated with ionizing radiation or the like, the starting material compound is introduced into a stainless steel (SUS) tube, and ionizing radiation or the like can be emitted from the outside of the SUS tube. Specifically, in the case of γ-ray irradiation, Co 60 can be used for γ-ray irradiation.

The SUS tube may be filled with one type of starting material compound, or a mixture of two or more types of starting material compounds in any proportion, depending on the type of target compound. The charge pressure (gauge pressure) at which the starting material compound is introduced into the SUS tube is not limited, and it can be set, for example, to −0.01 MPaG or more and 1.5 MPaG or less. The lower limit is preferably 0 MPaG or more, more preferably 0.1 MPaG or more, and even more preferably 0.2 MPaG or more. The upper limit is preferably 1.2 MPaG or less, and more preferably 1.0 MPaG or less. The charge pressure (gauge pressure) can be, for example, set to 0 MPa or more and 0.3 MPa or less, and preferably 0.1 MPa or more and 0.2 MPa or less. In the present disclosure, since there is no need to dilute the starting material compound with inert gas or the like as in conventional methods using a catalytic reaction, post-treatment or the like for separating the inert gas after obtaining the target compound is not required.

The irradiation dose of ionizing radiation or the like to the starting material compound is not limited as long as a target compound HFO or FO can be obtained. It is preferably set to 1 Gy or more and 1 MGy or less. Of these, the lower limit of the irradiation dose is preferably 10 Gy or more, more preferably 100 Gy or more, and even more preferably 1 kGy or more. The upper limit is 500 kGy or less, more preferably 300 kGy or less, and even more preferably 100 kGy or less. The irradiation dose can be set to 1 kGy or more and 5 kGy or less, or 2 kGy or more and 4 kGy or less, and further 3 kGy or more and 4 kGy or less.

The absorbed dose and irradiation dose can be converted using the following conversion formula (A).

$$D(T)=\alpha E \exp(-\alpha T) \tag{A}$$

wherein D is an absorbed dose, E is an irradiation dose, α is a linear absorption coefficient, and T is an irradiation distance, wherein α is a substance-specific value determined by the irradiation wavelength (which can be searched for from NIST Standard Reference Database 66 (X-Ray Form Factor, Attenuation, and Scattering Tables)), and T is a distance between an irradiation source and a sample (which can be randomly set).

For example, the irradiation dose [E(J/cm$^2$)] obtained when the energy ray having a specific wavelength is applied to a sample (HFC-32) from a specific distance [T] is measured, and the linear absorption coefficient of HFC-32 in a given wavelength range is checked in the NIST database above (the gas density according to pressure being separately calculated or measured) to determine the absorbed dose from the conversion formula.

In the present disclosure, regardless of the type of the starting material compound, ionizing radiation and/or an ultraviolet ray having a wavelength of 300 nm or less can be irradiated; however, when the starting material compound is an HFC having one carbon atom or an HFC having two carbon atoms, irradiation of ionizing radiation (particularly a γ-ray) is preferred; when the starting material compound is an HFOA, irradiation of ionizing radiation (particularly γ-ray) and/or an ultraviolet ray having a wavelength of 300 nm or less is preferred.

The irradiation time of ionizing radiation or the like is not limited, and can be suitably adjusted according to the starting material compound and the type and irradiation dose of ionizing radiation or the like. For example, the irradiation time can be set to 1 second or more and 50 hours or less. In this range, the irradiation time is preferably 1 hour or more and 30 hours or less, and more preferably 5 hours or more and 20 hours or less. The irradiation time can be set to 6 hours or more and 16 hours or less, and further 7.5 hours or more and 15 hours or less.

The starting material compound is irradiated with ionizing radiation or the like at a wide range of temperature, such as between −196° C. to 600° C. The present disclosure has a significant advantage over conventional thermal decomposition methods particularly in that the reaction can proceed at a temperature condition of 10° C. or more and 50° C. or less. For example, the reaction can be performed at 1° C. or more to a room temperature of 30° C. or less (preferably 15° C. or more and 25° C. or less).

The method for producing an HFO or FO of the present disclosure can be performed in either batch mode or continuous mode, and each of the conditions described above can be suitably adjusted by selecting batch mode or continuous mode. The method for producing an HFO of the present disclosure has a remarkable effect that the selectivity of the target compound is remarkably high as compared to a conventional thermal decomposition method or a method using a catalyst. Specifically, the selectivity of the target compound HFO or FO in a preferable embodiment is 95.0 mol % or more, more preferably 97.0 mol % or more, and even more preferably 99.0 mol % or more. On the other hand, the conversion rate of the starting material compound can be suitably set by adjusting irradiation conditions such as ionizing radiation or the like to the range of 0.1 mol % or more. In a preferred embodiment, the conversion rate can be increased to about 25 mol %.

HFOs or FOs, which have an unsaturated bond, generate many by-products in a conventional thermal decomposition method or the like. Some of the by-products have a boiling point close to that of the target compound HFO or FO, which results in a complicated problem of post treatment, such as a separation treatment. In contrast, the method for producing a HFO or FO of the present disclosure has a significant advantage over conventional methods because a novel configuration in which a starting material compound is irradiated with ionizing radiation or the like attains a selectivity of the target compound HFO or FO of 95 mol % or more in a preferable embodiment. In addition, as compared to conventional methods using a catalytic reaction, dilution with an inert gas or the like is not required, and the method for producing an HFO or FO of the present disclosure is a simple and clean method in this respect as well. In the method for producing an HFO or FO of the present disclosure, the bond in the starting material compound can be selectively broken by irradiating the starting material compound with ionizing radiation or the like to produce a radical in which fluorine is eliminated by elimination of at least a fluorine atom, thus finally obtaining a target compound HFO or FO. Accordingly, the production method of the present disclosure is significantly advantageous over conventional methods in that it does not require a high temperature, a catalyst, or dilution with an inert gas in the step of obtaining a target compound.

The HFO or FO, which is a target compound, produced by the method for producing an HFO or FO of the present disclosure is not limited. Examples include trifluoroethylene (HFO-1123), 1,2-difluoroethylene (HFO-1132 (E)/(Z)), 1-fluoroethylene (HFO-1141), 1,1,1,4,4,4-hexafluoro-2-butene (HFO-1336mzz(E)/(Z)), 1,2,3,3-tetrafluoropropene (HFO-1234ye(E)/(Z)), 1,3,3,3-tetrafluoropropene (HFO-1234ze(E)/(Z)), 2,3,3,3-tetrafluoropropene (HFO-1234yf), tetrafluoroethylene (FO-1114), 1,1-difluoroethylene (HFO-1132a), and the like.

The mechanism of the method for producing an HFO or FO of the present disclosure is described below with reference to an example. However, the following mechanism is an example of a presumed mechanism obtained when starting material compounds (fluoromethane (HFC-41), difluoromethane (HFC-32), and trifluoromethane (HFC-23)) are irradiated with ionizing radiation (particularly a γ-ray), and the mechanism is not limited thereto.

All of these starting material compounds are HFCs having one carbon atom, and reaction steps are generalized and explained below.

Step 1: By irradiating the starting material compound with a γ-ray, the bond in the starting material compound is selectively broken to eliminate a fluorine atom (fluorine radical), thus producing a radical in which fluorine is eliminated.

Step 2: The fluorine radical allows the elimination of a hydrogen atom in the starting material compound to form a hydrogen fluoride (HF) and a radical in which hydrogen is eliminated.

Step 3: By the reaction between radicals in which fluorine is eliminated, reaction between radicals in which hydrogen is eliminated, and reaction between a radical in which fluorine is eliminated and a radical in which hydrogen is eliminated, an HFC having two carbon atoms is produced.

Step 4: By irradiating the HFC having two carbon atoms with a γ-ray, a fluorine atom (fluorine radical) is eliminated from the HFC having two carbon atoms, thus producing an HFC radical having two carbon atoms in which fluorine is eliminated.

Step 5: The fluorine radical allows the elimination of a hydrogen atom in the HFC having two carbon atoms to produce a hydrogen fluoride (HF) and an HFO having two carbon atoms (target compound).

Thereby, 1-fluoroethylene (HFO-1141) is produced from fluoromethane (HFC-41), trifluoroethylene (HFO-1123) and 1,2-difluoroethylene (HFO-1132(E)/(Z)) are produced from difluoromethane (HFC-32), and 1-fluoroethylene (HFO-1141) and trifluoroethylene (HFO-1123) are produced from trifluoromethane (HFC-23).

When difluoromethane (HFC-32) is used as a starting material compound, if the tetrafluoromethane (FC-14) is additionally used as a starting material compound, it is presumed that irradiation of ionizing radiation produces a radical ($CF_3 \cdot$) in which hydrogen is eliminated from FC-14, and that if a radical ($\cdot CH_2F$) from HFC-32 is present together with ($CF_3 \cdot$), $CF_3$—$CH_2F$ (HFC-134a) is produced, thus finally producing HFO-1123 by irradiation of ionizing radiation. Accordingly, the additional use of FC-14 is expected to improve the selectivity of HFO or FO having a high fluorine content.

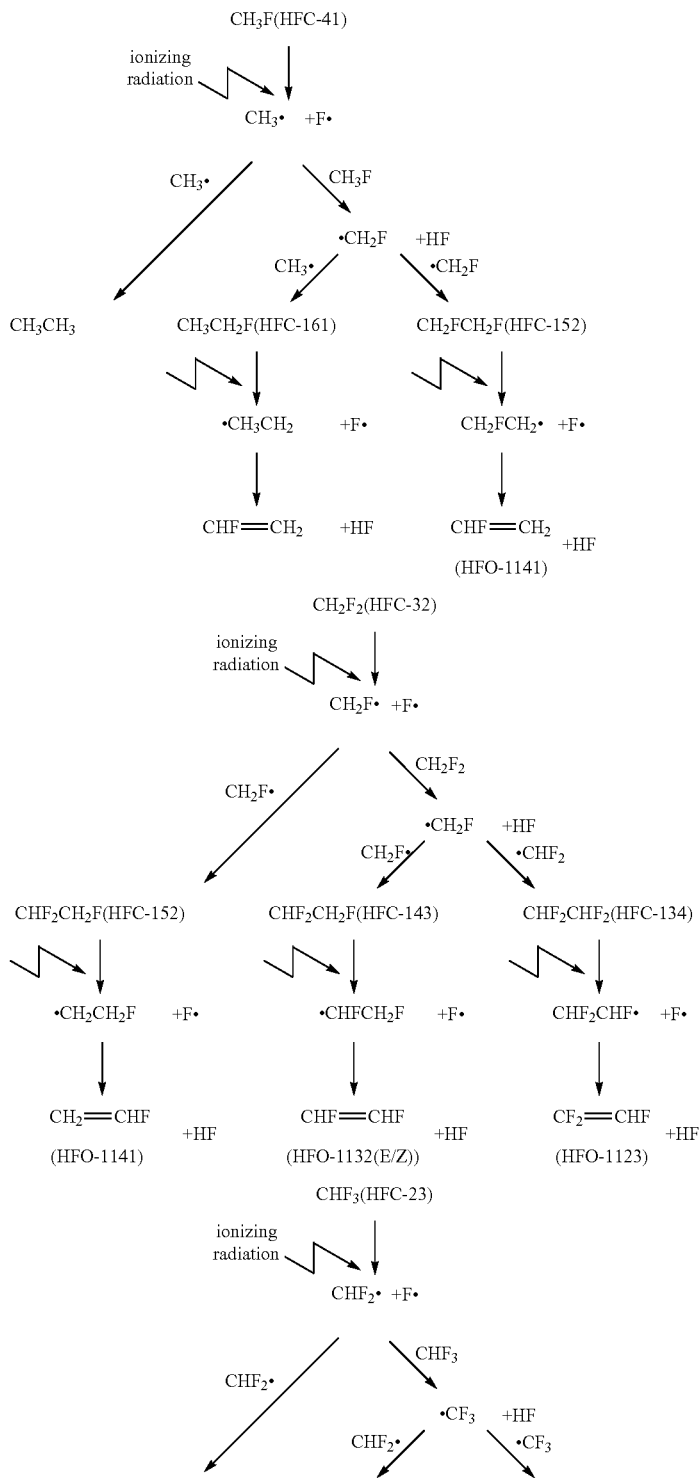

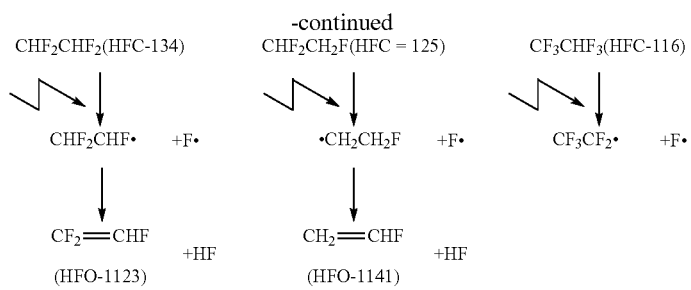

Composition Comprising Hydrofluoroolefin (HFO) or Fluoroolefin (FO)

According to the method for producing an HFO or FO of the present disclosure, in a preferable embodiment, a composition in which the selectivity of a target compound HFO or FO in a reaction product after separation of the starting material compound is 95.0 mol % or more, and particularly 99.0 mol % or more, can be obtained.

In the present disclosure, such an HFO- or FO-containing composition is, for example, a composition comprising trifluoroethylene (HFO-1123), 1,2-difluoroethylene (HFO-1132(E)/(Z)), tetrafluoroethylene (FO-1114), or 1,1-difluoroethylene (HFO-1132a) in an amount of 99.0 mol % or more; and further comprising at least one member selected from the group consisting of fluoroacetylene, trifluoromethane (HFC-23), 1,1,2,2-tetrafluoroethane (HFC-134), and 1,1,2-trifluoroethane (HFC-143).

In addition, according to the HFO production method of the present disclosure, unlike conventional thermal decomposition methods (which generally have a "coking problem"), the content of the aromatic compound in the by-product is suppressed to a remarkably low level. The extremely low content of the aromatic compound in which the coking with carbon is a concern is advantageous as compared to conventional methods. Such an HEO- or FO-containing composition is a composition containing trifluoroethylene (HFO-1123), 1,2-difluoroethylene (HFO-1132(E)/(Z)), tetrafluoroethylene (FO-1114), or 1,1-difluoroethylene (HFO-1132a) in an amount of 99.0 mol % or more, wherein the content of the aromatic compound represented by formula (5):

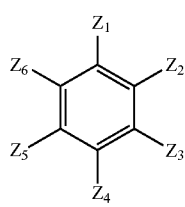

(5)

with the proviso that $Z_1$, $Z_2$, $Z_3$, $Z_4$, $Z_5$, and $Z_6$ are each individually a hydrogen atom or a fluorine atom,
is less than 0.1 ppm. The content of the aromatic compound in the present disclosure is based on measurements using an instrument such as a column chromatograph (model number: GC7890A) produced by Agilent Technology Inc. or a column chromatograph mass spectrometer (model number: GCMS-QP2020) produced by Shimadzu Corporation.

The HFO or FO-containing compositions of the present disclosure can be used as various functional materials, solvents, refrigerants, foaming agents, monomers for functional polymers, or starting materials of such monomers, and can be applied as refrigerants with low global warming potential (GWP) in refrigerant applications.

As described above, the present disclosure includes the following.

1. A method for producing a hydrofluoroolefin or fluoroolefin having two, three, or four carbon atoms, comprising irradiating at least one starting material compound selected from the group consisting of hydrofluorocarbons having one or two carbon atoms and hydrofluoroolefin As having two or three carbon atoms with ionizing radiation and/or an ultraviolet ray having a wavelength of 300 nm or less, with the proviso that when the at least one starting material compound is the hydrofluoroolefin A, the resulting hydrofluoroolefin is different from the hydrofluoroolefin A.

2. The method for producing a hydrofluoroolefin or fluoroolefin according to Item 1, wherein the ionizing radiation is a γ ray.

3. The method for producing a hydrofluoroolefin or fluoroolefin according to Item 1 or 2, wherein the absorbed dose of the ionizing radiation and/or ultraviolet ray having a wavelength of 300 nm or less is 1 Gy or more and 1 MGy or less.

4. The method for producing a hydrofluoroolefin or fluoroolefin according to any one of Items 1 to 3, wherein the starting material compound is at least one fluoromethane compound represented by formula (1):

(1)

with the proviso that $X_1$, $X_2$, $X_3$, and $X_4$ are each individually a hydrogen atom or fluorine atom, and at least one hydrogen atom and at least one fluorine atom are contained; and/or at least one fluoroethane compound represented by formula (2):

(2)

with the proviso that $Y_1$, $Y_2$, $Y_3$, $Y_4$, $Y_5$, and $Y_6$ are each individually a hydrogen atom or fluorine atom, and at least one hydrogen atom and at least one fluorine atom are contained.

5. The method for producing a hydrofluoroolefin or fluoroolefin according to any one of Items 1 to 3, wherein the starting material compound is at least one fluoroethylene compound represented by formula (3):

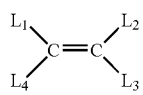
(3)

with the proviso that $L_1$, $L_2$, $L_3$, and $L_4$ are each individually a hydrogen atom or fluorine atom, and at least one hydrogen atom and at least one fluorine atom are contained; and/or at least one fluoropropene compound represented by formula (4):

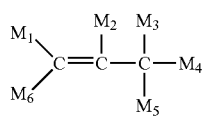
(4)

with the proviso that $M_1$, $M_2$, $M_3$, $M_4$, $M_5$, and $M_4$ are each individually a hydrogen atom or fluorine atom, and at least one hydrogen atom and at least one fluorine atom are contained.

6. The method for producing a hydrofluoroolefin or fluoroolefin according to any one of Items 1 to 5, wherein the starting material compound is irradiated with the ionizing radiation and/or ultraviolet ray at −196° C. or more and 600° C. or less.

7. The method for producing a hydrofluoroolefin or fluoroolefin according to any one of Items 1 to 6, wherein the reaction is performed in batch mode or continuous mode.

8. A composition comprising trifluoroethylene (HFO-1123), 1,2-difluoroethylene (HFO-1132 (E)/(Z)), tetrafluoroethylene (FO-1114), or 1,1-difluoroethylene (HFO-1132a) in an amount of 99.0 mol % or more, and further comprising at least one member selected from the group consisting of fluoroacetylene, trifluoromethane (HFC-23), 1,1,2,2-tetrafluoroethane (HFC-134), and 1,1,2-trifluoroethane (HFC-143).

9. A composition comprising trifluoroethylene (HFO-1123), 1,2-difluoroethylene (HFO-1132 (E)/(Z)), tetrafluoroethylene (FO-1114), or 1,1-difluoroethylene (HFO-1132a) in an amount of 99.0 mol % or more, wherein the content of an aromatic compound represented by formula (5):

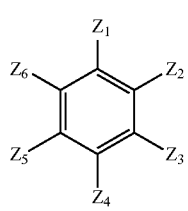
(5)

with the proviso that $Z_1$, $Z_2$, $Z_3$, $Z_4$, $Z_5$, and $Z_6$ are each individually a hydrogen atom or a fluorine atom, is less than 0.1 ppm.

EXAMPLES

The present disclosure is explained with reference to Examples and Comparative Examples; however, the present disclosure is not limited to the Examples.

Examples 1 to 4: Synthesis of HFO by γ-Ray Irradiation

Starting material compounds were prepared as described in Tables 1 and 2.

Each of the starting material compounds was introduced into a SUS tube at a charge pressure as shown in Tables 1 and 2.

Subsequently, the starting material compound introduced into the SUS tube was irradiated with a γ-ray using Co 60 at room temperature. The γ-ray irradiation conditions (irradiation dose, irradiation time, and integrated irradiation dose) are as shown in Tables 1 and 2.

Gas in the SUS tube after irradiation was then sampled with a gas-tight syringe and analyzed using an instrument such as a column chromatograph (model number: GC7890A) produced by Agilent Technologies Inc. or a column chromatograph mass spectrometer (model number: GCMS-QP2020) produced by Shimadzu Corporation.

The compositions of reaction products (unit: mol %) were as follows.

TABLE 1

γ ray irradiation experiment

| | | Example1 | Example2 |
|---|---|---|---|
| Experimental conditions | Starting material compound | HFC-32 | HFC-32 |
| | Pressure (MPaG) | 0.2 | 0.1 |
| | Irradiation dose (kGy/h) | 3.5 | 3.5 |
| | Irradiation time (h) | 15 | 7.5 |
| | Integrated irradiation dose (kGy) | 52.5 | 26.25 |
| Measurement results | GC area of sample after irradiation (%) | | |
| | HFC-32 | 75.03% | 96.77% |
| | HFO-1123 | 24.76% | 3.12% |
| | HFO-1132(E) | 0.05% | 0.03% |
| | HFO-1132(Z) | 0.00% | 0.00% |
| | HFC-134 | 0.00% | 0.00% |
| | HFC-143 | 0.03% | 0.01% |
| | Fluorobenzen compound | 0.00% | 0.00% |
| | Other component(s) | 0.13% | 0.07% |
| | Conversion rate of HFC-32 | 24.99% | 3.23% |
| | Conversion rate of HFO-1123 | 99.15% | 96.63% |

As is clear from the results in Table 1, the selectivity of target HFO (HFO-1123) in the reaction product after the separation of the starting material was 95.0 mol % % or more in both Examples 1 and 2.

TABLE 2

| | | γ ray irradiation experiment | |
|---|---|---|---|
| | | Example 3 | Example 4 |
| Experimental conditions | Starting material compound | HFO1234yf | HFO1234yf |
| | Pressure (MPaG) | 0.2 | 0.1 |
| | Irradiation dose (kGy/h) | 3.5 | 3.5 |
| | Irradiation time (h) | 15 | 7.5 |
| | Integrated irradiation dose (kGy) | 52.5 | 26.25 |
| Measurement results | GC area of sample after irradiation (%) | | |
| | HFO-1234yf | 89.56% | 99.00% |
| | HFO-1123 | 10.23% | 0.83% |
| | HFO-1132(E) | 0.01% | 0.00% |
| | HFO-1132(Z) | 0.00% | 0.00% |
| | HFC-134 | 0.00% | 0.02% |
| | HFC-143 | 0.00% | 0.00% |
| | Fluorobenzen compound | 0.00% | 0.00% |
| | Other component(s) | 0.20% | 0.15% |
| | Conversion rate of HFO1234yf | 10.45% | 1.00% |
| | Conversion rate of HFO-1123 | 97.99% | 83.03% |

As is clear from the results in Table 2, in Example 3, the selectivity of target HFO (HFO-1123) in the reaction product after the separation of the starting material was 95.0 mol % or more. In Example 4, due to the low conversion rate of the starting material compound in Example 4, the selectivity of the target HFO (HFO-1123) in the reaction product after the separation of the starting material is less than 95.0 mol %; however, Example 4 has a significant advantage over the conventional thermal decomposition methods in that the selectivity exceeds 80.0 mol %.

Comparative Example 1: Synthesis of HFO by Thermal Decomposition of HFC-32

Difluoromethane (HFC-32) was prepared as a starting material compound.

Trifluoroethylene (HFO-1123), which was the target compound, was synthesized by a thermal decomposition method from HFC-32, which had been introduced into the SUS tube.

Thermal decomposition conditions are as shown in Table 3.

Subsequently, the gas in the SUS tube after the thermal decomposition was sampled with a gas-tight syringe and analyzed using an instrument such as a column chromatograph (model number: GC7890A) produced by Agilent Technologies Inc. or a column chromatograph mass spectrometer (model number: GCMS-QP2020) produced by Shimadzu Corporation.

The composition of the reaction product (unit: mol %) was as follows.

TABLE 3

| | Thermal decomposition reaction experiment | |
|---|---|---|
| | | Comparative Example 1 |
| Experimental conditions | Starting material compound | HFC-32 |
| | Reaction temperature (° C.) | 900 |
| | Residence time (s) | 0.4 |

TABLE 3-continued

| | Thermal decomposition reaction experiment | |
|---|---|---|
| | | Comparative Example 1 |
| Measurement results | GC area of sample after reaction (%) | |
| | HFC-32 | 93.97% |
| | HFO-1123 | 0.28% |
| | HFO-1132(E) | 0.59% |
| | HFO-1132(Z) | 0.91% |
| | HFC-134 | 0.85% |
| | HFC-143 | 1.00% |
| | Fluorobenzen compound | 0.10% |
| | Other component(s) | 2.31% |
| | Conversion rate of HFC-32 | 6.04% |
| | Selectivity of HFO-1123 | 4.62% |
| | Selectivity of HFO-1132 (E) | 10.46% |
| | Selectivity of HFO-1132 (Z) | 15.10% |

As is clear from Table 3, it was found that, in Comparative Example 1, multiple HFOs having similar boiling points were formed in the reaction product after the separation of the starting material, and the selectivity of each HFO was significantly lower than those of Examples 1 to 4.

The invention claimed is:

1. A method for producing a hydrofluoroolefin or fluoroolefin having two, three, or four carbon atoms, comprising irradiating at least one starting material compound selected from the group consisting of hydrofluorocarbons having one or two carbon atoms and hydrofluoroolefin As having two or three carbon atoms with ionizing radiation and/or an ultraviolet ray having a wavelength of 300 nm or less, with the proviso that when the at least one starting material compound is the hydrofluoroolefin A, the resulting hydrofluoroolefin is different from the hydrofluoroolefin A.

2. The method for producing a hydrofluoroolefin or fluoroolefin according to claim 1, wherein the ionizing radiation is a γ ray.

3. The method for producing a hydrofluoroolefin or fluoroolefin according to claim 1, wherein the absorbed dose of the ionizing radiation and/or ultraviolet ray having a wavelength of 300 nm or less is 1 Gy or more and 1 MGy or less.

4. The method for producing a hydrofluoroolefin or fluoroolefin according to claim 1, wherein the starting material compound is at least one fluoromethane compound represented by formula (1):

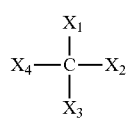

(1)

with the proviso that $X_1$, $X_2$, $X_3$, and $X_4$ are each individually a hydrogen atom or fluorine atom, and at least one hydrogen atom and at least one fluorine atom are contained; and/or at least one fluoroethane compound represented by formula (2):

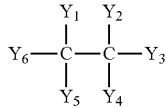 (2)

with the proviso that $Y_1$, $Y_2$, $Y_3$, $Y_4$, $Y_5$, and $Y_6$ are each individually a hydrogen atom or fluorine atom, and at least one hydrogen atom and at least one fluorine atom are contained.

5. The method for producing a hydrofluoroolefin or fluoroolefin according to claim 1, wherein the starting material compound is at least one fluoroethylene compound represented by formula (3):

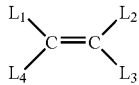 (3)

with the proviso that $L_1$, $L_2$, $L_3$, and $L_4$ are each individually a hydrogen atom or fluorine atom, and at least one hydrogen atom and at least one fluorine atom are contained; and/or at least one fluoropropene compound represented by formula (4):

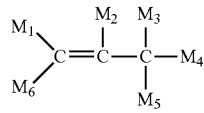 (4)

with the proviso that $M_1$, $M_2$, $M_3$, $M_4$, $M_5$, and $M_6$ are each individually a hydrogen atom or fluorine atom, and at least one hydrogen atom and at least one fluorine atom are contained.

6. The method for producing a hydrofluoroolefin or fluoroolefin according to claim 1, wherein the starting material compound is irradiated with the ionizing radiation and/or ultraviolet ray at −196° C. or more and 600° C. or less.

7. The method for producing a hydrofluoroolefin or fluoroolefin according to claim 1, wherein the reaction is performed in batch mode or continuous mode.

* * * * *